(12) United States Patent
Porter (10) Patent No.: US 6,665,975 B2
(45) Date of Patent: Dec. 23, 2003

(54) MOTION DECOY

(75) Inventor: David Porter, Holden, LA (US)

(73) Assignee: BFC Marine, Inc., Holden, LA (US)

( * ) Notice: Subject to any disclaimer, the term of this patent is extended or adjusted under 35 U.S.C. 154(b) by 0 days.

(21) Appl. No.: 09/952,713

(22) Filed: Sep. 14, 2001

(65) Prior Publication Data

US 2003/0204983 A1 Nov. 6, 2003

(51) Int. Cl.[7] .............................................. A01M 31/06
(52) U.S. Cl. ........................................................ 43/3
(58) Field of Search ......................... 43/3, 2; 242/378.4; 446/40–42, 249

(56) References Cited

U.S. PATENT DOCUMENTS

| | | | |
|---|---|---|---|
| 696,990 A | * 4/1902 | Mettler | 446/41 |
| 945,934 A | * 1/1910 | Gilmore | 446/41 |
| 1,731,047 A | * 10/1929 | Holtzman | 446/232 |
| 1,914,076 A | * 6/1933 | Chase | 446/41 |
| 4,611,421 A | 9/1986 | Jacob | |
| 4,896,448 A | 1/1990 | Jackson | |
| 5,036,614 A | 8/1991 | Jackson | |
| 5,231,780 A | 8/1993 | Gazalski | |
| 5,367,813 A | * 11/1994 | Cherry | 43/2 |
| 5,862,619 A | 1/1999 | Stancil | |
| 6,092,323 A | 7/2000 | McBride et al. | |
| 6,170,188 B1 | 1/2001 | Mathews | |
| 6,430,863 B1 | * 8/2002 | Krag | 43/3 |
| 6,487,811 B2 | * 12/2002 | Barrett | 43/3 |

OTHER PUBLICATIONS

Mack's Prairie Wings 2000–2001 Catalog; pp. 14, 15, 16, 17, 20 and 21; Stuttgart, Arkansas.
Herter's 2000 Catalog; pp. 8, 25, 26, 27, 28, 29, 30 and rear cover; Greenville, North Carolina.
Cabela's Waterfowl Fall 2001 Catalog, Published Aug. 2001; pp. 6, 8, 9, 20, 21, and rear cover; Sidney, Nebraska.

* cited by examiner

*Primary Examiner*—Charles T. Jordan
*Assistant Examiner*—Kimberly S. Smith
(74) *Attorney, Agent, or Firm*—Roy, Kiesel, Keegan and DeNicola (57) ABSTRACT

A motion waterfowl decoy. The preferred embodiment has a pair of wings mounted to an axle such that the wings rotate with the axle. The wings' undersides are preferably lighter than their topsides. A pull cord is wound about the axle so that unwinding the cord will spin the axle and wings. As the wings rotate, their lighter underside is alternately displayed, creating a strobelike effect resembling wings flapping. A biasing device such as a length of rubber or latex tubing or a spring is attached to the axle. Rotating the axle by pulling the cord loads the biasing device. When the cord is released, the biasing device will unload, causing the axle and wings to rotate in the opposite direction and rewinding the pull cord about the axle. The decoy preferably floats, and can be used to disturb the water's surface in imitation of landing or feeding waterfowl.

51 Claims, 10 Drawing Sheets

MOTION DECOY

BACKGROUND OF THE INVENTION

1. Field of the Invention

The invention relates to waterfowl decoys in general and to motion waterfowl decoys in particular.

2. Prior Art

The use of decoys that move are well known in the field of waterfowling. Hunters have long used simple devices such as strings tied to floating decoys to cause the decoys to bob and move. Flying birds notice the moving decoy more readily and at a greater distance than they would a stationary decoy. Moreover, the motion of the decoy in the water generates ripples. Like the motion of the decoy itself, the ripples also catch the eye of passing birds, and a rippled surface looks more realistic than a glassy smooth one, since a flock of waterfowl will disturb the surface as they dabble, feed, and preen.

Another relatively simple motion decoy is the flag decoy. These devices are simple waterfowl shaped flags on a long pole. The flag is waved at distant birds. The motion of the flag is used to catch the birds' attention. Like all the other decoys described herein, the flag-type decoys are typically used in conjunction with calling-making sounds that mimic the natural calls of the waterfowl.

At a distance, the flag resembles the motion of bird landing. However, as the birds approach, the flag must be put down, as the motion is not realistic enough to be used with birds in close proximity to the hunter. Additionally, flag decoys are not particularly well suited to hunting over water. As the birds approach, the flag decoy either has to be hidden standing up, which can be difficult in view of their length, or put down in the water, resulting in a wet flag that does not flutter as realistically when the next flight approaches. Consequently, these decoys are used primarily for hunting in dry fields.

A slightly more complicated motion decoy is the wind sock decoy. These decoys are, as their name suggests, wind socks that are shaped and often painted to look like waterfowl. An example can be found in U.S. Pat. No. 4,611,421. The wind sock decoys are mounted on shafts that are placed in the ground. The tops of the shafts are provided with heads that resemble the head of a duck or goose. As the wind fills the wind sock, it causes the decoy to do two things. First, the wind socks spin on their shafts so that the decoys are facing into the wind, the natural way for waterfowl to face. A headwind allows birds to take flight more quickly, and most waterfowl will naturally adopt this position when resting or feeding in order to rapidly take to the wing should danger threaten. Second, the wind filling the socks causes the decoys to move or shimmy, again with the effect of catching the eye of distant birds. Although these decoys work very, well in certain conditions, they perform poorly in others. Wind sock decoys do not require a great deal of wind, but they do not provide any motion in completely calm conditions. High wind situations can be equally problematic as a fresh breeze can cause a wind sock to move very vigorously, giving the unrealistic impression of a flock of geese who had too much coffee that morning. The wind sock decoys also work best when deployed in a dry field. When used in water, the fabric socks droop in the water in calm conditions and may become wet, preventing them from rising in a light wind. Additionally, waterfowl are often pursued in inclimate weather; and rain, freezing rain, sleet, or snow falling on wind sock decoys can also weigh the socks down, preventing them from rising in the breeze.

Similar to the wind sock is the whirligig, an example of which can be found in U.S. Pat. No. 5,862,619. This device features a decoy mounted on a post and having a set of free spinning "wings." Sometimes, the wings are used without the decoy body. When the wind blows, the wings spin. One side of the wings are typically painted dark and the other white so that the spinning motion resembles the flapping wings of a duck or goose. This device works like the others mentioned above in that it attracts birds from afar with the motion of its spinning wings. It works equally well over water as on land. However, most whirligig type decoys require a breeze to operate at all. Additionally, the whirligig adds no motion to the surface when used over water. Finally, it continues to move when waterfowl approach. This is an unnatural look, as the decoy continues to hover in place without ever setting or more strangely still, flaps its wings continuously while sitting on the water. Although these devices are often very effective early in the season, waterfowl that have been hunted appear to learn to associate a bird that flaps and flaps but never lands with hunters and are known to flare away from such devices, particularly as the season progresses.

Very similar to the whirligig discussed above are mechanical flapping decoys, an example of which is contained in U.S. Pat. No. 6,170,188. These decoys also have a set of spinning wings on a shaft. However, instead of being wind driven, they are motor driven-typically by small electric motors. They work in substantially the same way as the whirligig, except they are not dependant upon the wind. Otherwise, their drawbacks are the same. However, the electric version typically costs substantially more than its wind driven cousin. The problem of the whirligig continuing to run as the birds approach can also be addressed in the motor driven version by adding a remote control device; however, this also adds to the expense of the decoy.

Still another type of motion decoy are those with moving body parts, such as that illustrated in U.S. Pat. No. 5,231,780. In these decoys, a string is typically attached to the decoy's wing or head. By pulling on the string, the decoy can be made to turn its head and/or raise its wings. The head typically twists on a shaft while the wings turn on a shaft back and forth across an arc rather than spinning like the wings of the whirligig type decoys. The principle drawback with these decoys is the degree of motion they provide. A turn of the decoy's head or a flagging of the decoy's wings, may prove especially realistic when the birds are quite close. However, such minimal amounts of movement are not likely to be noticed by high flying birds that one is attempting to attract. Further, the decoys disclosed in the '780 Patent are typically used on land and are not designed to disturb the surface of the water in imitation of an active duck or goose.

In view of the foregoing shortcomings in the prior art, a motion decoy that meets the following objectives is desired.

OBJECTS OF THE INVENTION

It is an object of the invention to provide a waterfowl decoy that moves.

It is another object of the invention to provide a waterfowl decoy that imitates the flapping of wings.

It is still another object of the invention to provide a waterfowl decoy that moves without need of the wind.

It is still another object of the invention to provide a waterfowl decoy that moves without need of a motor.

It is yet another object of the invention to provide a waterfowl decoy that will disturb the surface of the water on which the decoy is floating.

It is yet another object of the invention to provide a waterfowl decoy whose movement may be controlled by a human operator.

It is yet another object of the invention to provide a waterfowl decoy whose motion may be stopped as waterfowl approach the decoy.

SUMMARY OF THE INVENTION

The invention comprises a waterfowl decoy provided with a pair of wings mounted on an axle. The axle is biased against rotation in one direction, typically with surgical tubing or a spring. It is also provided with a pull cord that is attached to the axle. The pull cord should be wound about the axle so that when tension is applied to the pull cord, the axle will be rotated as the pull cord is unwound. This will cause the wings to spin. However, the direction in which the axle rotates when tension is applied to the pull cord should be the direction against which the axle is biased, such that rotating the axle by pulling the string will cause the tension on the axle to increase. Thus, when the tension on the pull cord is released, the tension on the axle from the biasing force will cause the axle and the wings to spin in the opposite direction. This will rewind the string around the axle, readying the decoy for another pull.

The underside of the wings are preferably white while the top side of the wings are painted a dull color such a green or brown. As the wings spin, the white side flashes in a strobelike fashion, giving the appearance of a duck or goose flapping its wings.

In the preferred embodiment, the decoy is a floating decoy or is mounted to a floating frame. In this embodiment, the decoy is secured to a stake, anchor, or other relatively immobile object. If the decoy is not so secured, pulling on the pull cord will simply draw the decoy to the user rather than causing the wings to spin. However, if the decoy is anchored to a fixed object, pulling on the pull cord will cause the decoy to move forward until the anchor line becomes taut. If the pull cord is given a sharp jerk, the decoy will splash the water and create ripples as it moves forward and then spin its wings as the pull cord is unwound from the axle. This will create the impression of a bird that has just landed in the water. Then, when the pull cord is released, the wings will spin again, in imitation of the common habit of waterfowl to stretch and dry their wings after they land.

DETAILED DESCRIPTION OF THE INVENTION

Figure 1A:
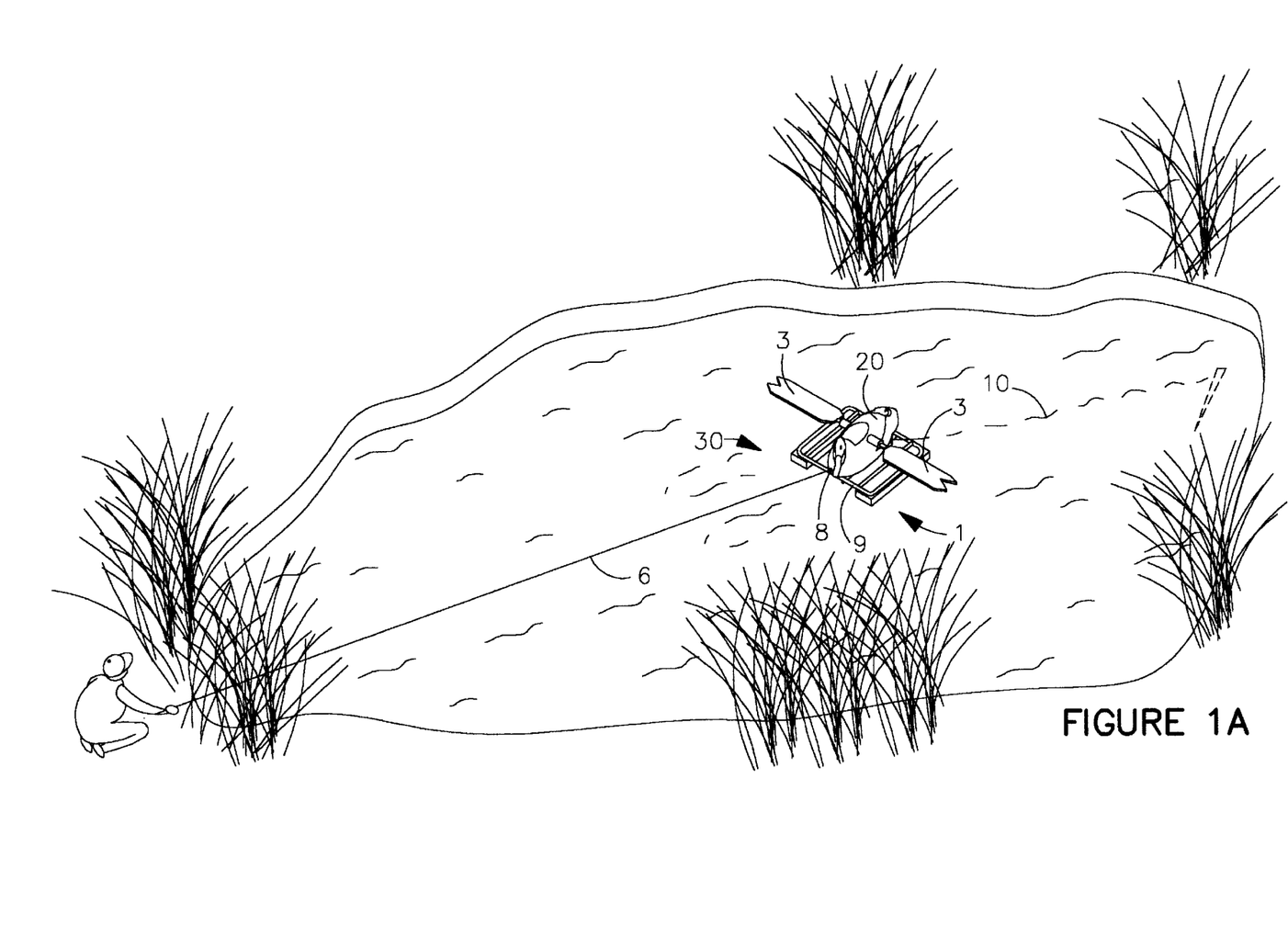
FIG. 1A is a perspective view of a preferred embodiment of the invention floating before tension is applied to the pull cord.
Figure 1B:
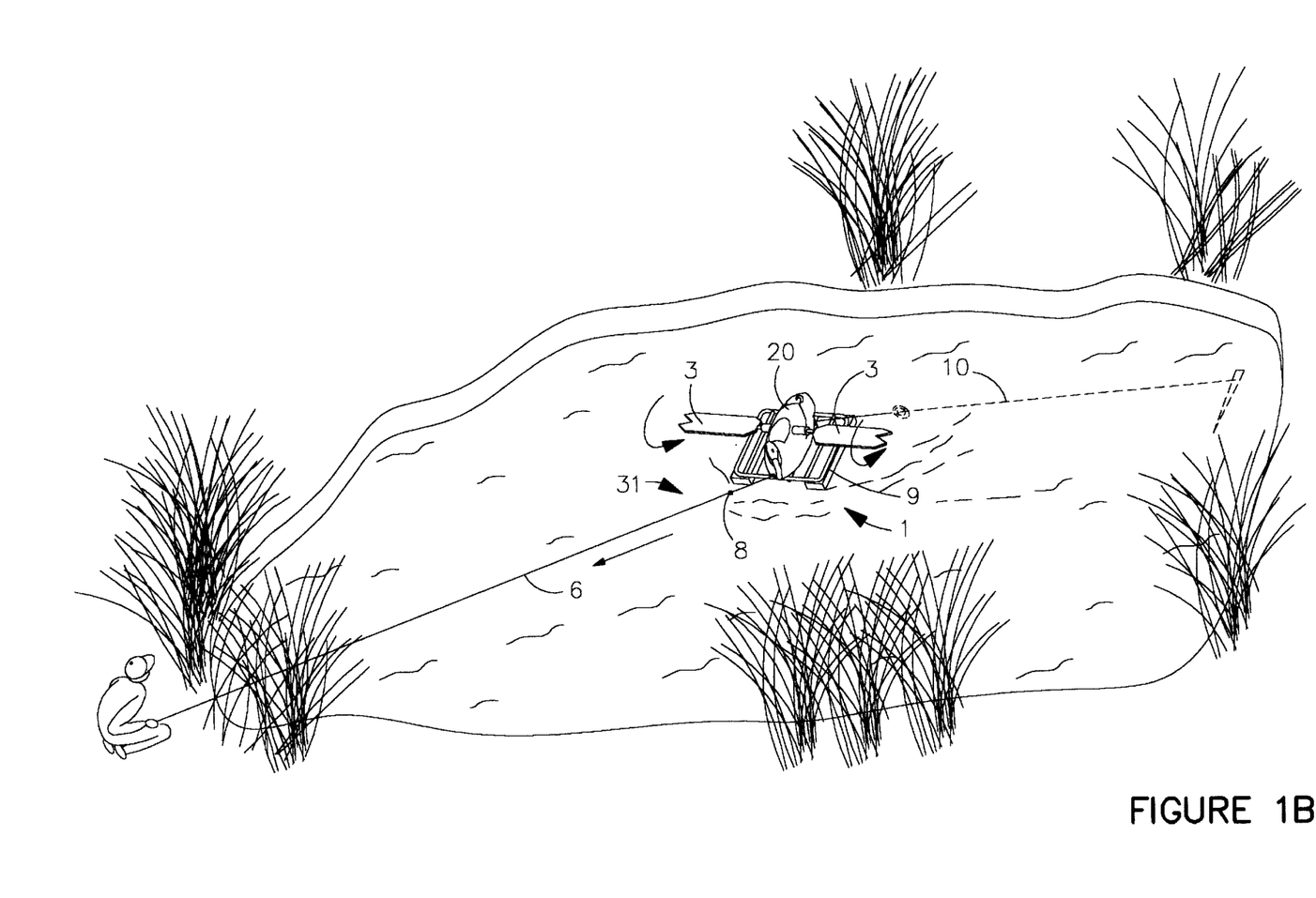
FIG. 1B is a perspective view of a preferred embodiment of the invention floating while tension is applied to the pull cord.
Figure 1C:
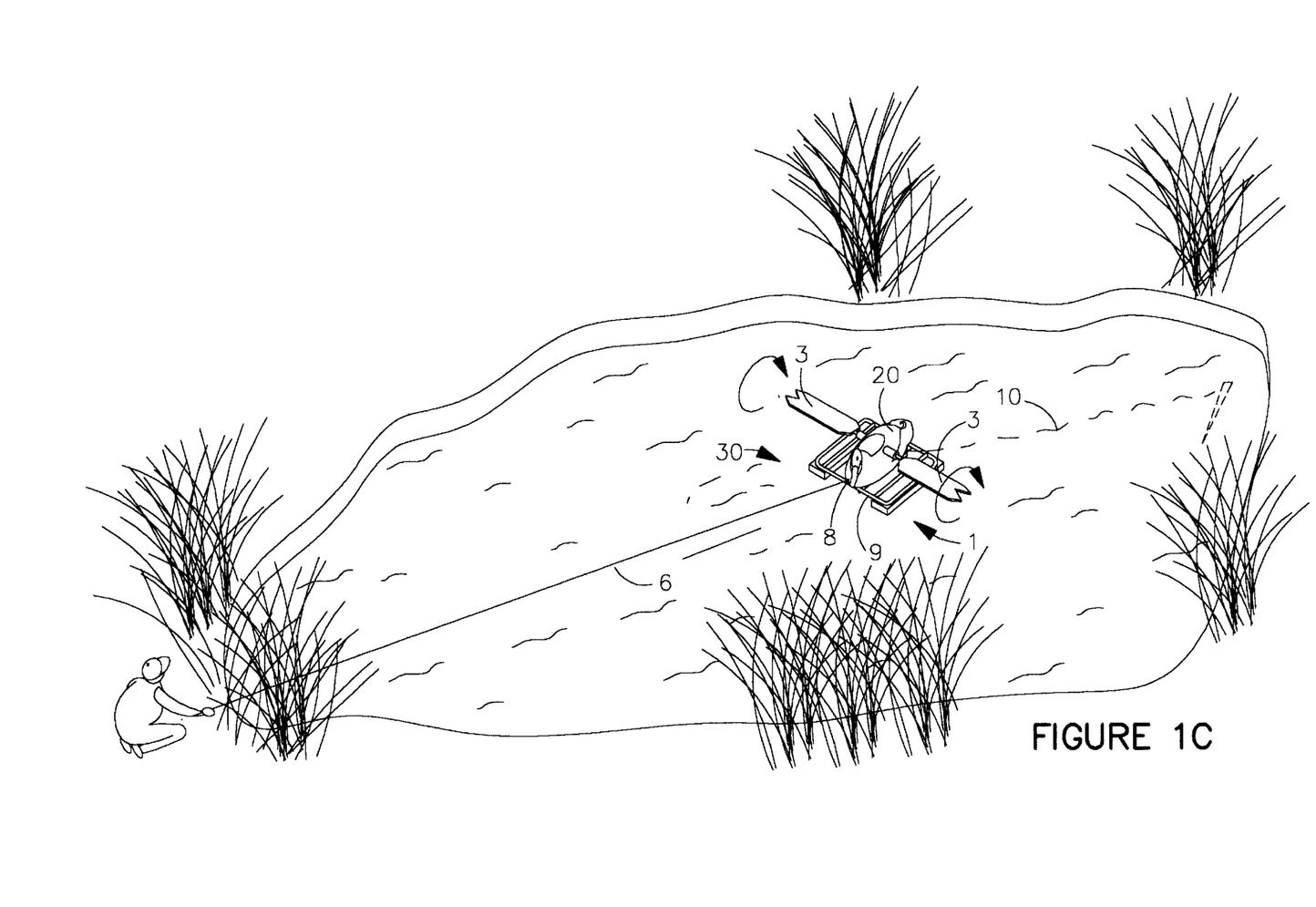
FIG. 1C is a perspective view of a preferred embodiment of the invention floating after tension on the pull cord has been released.
Figure 2A:
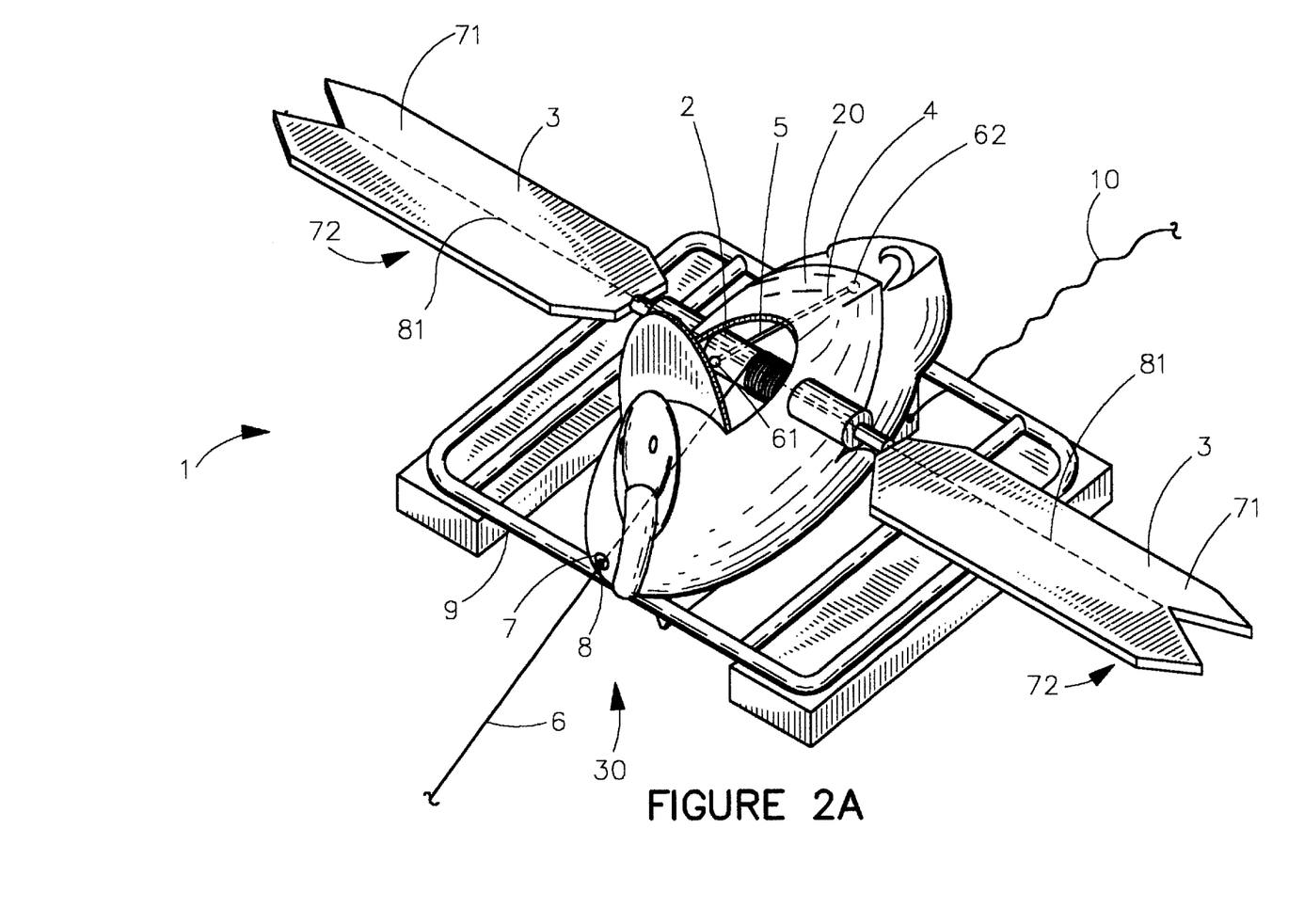
FIG. 2A is a perspective partial cut-away view of a preferred embodiment of the invention before tension is applied to the pull cord.
Figure 2B:
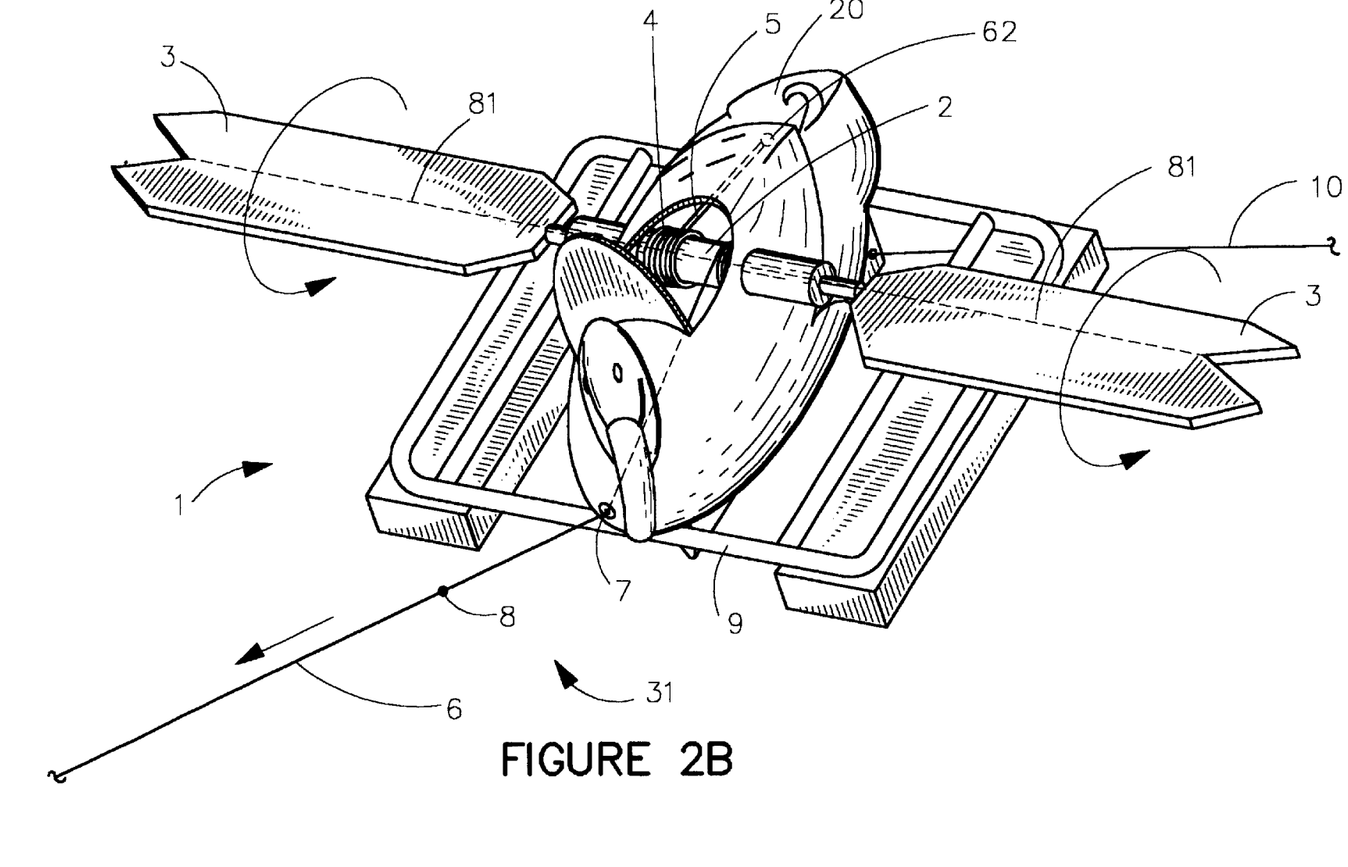
FIG. 2B is a perspective partial cut-away view of a preferred embodiment of the invention while tension is applied to the pull cord.
Figure 2C:
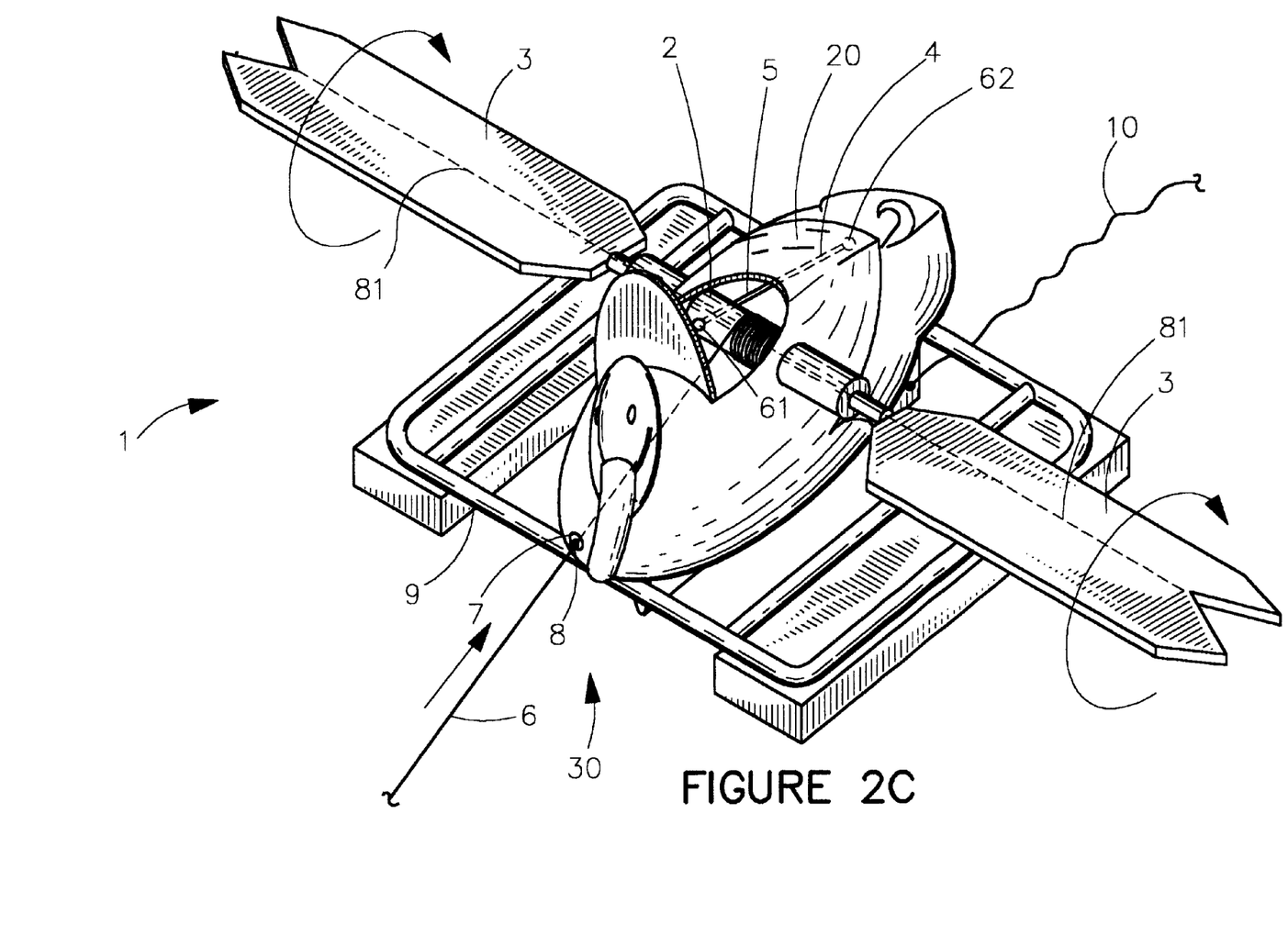
FIG. 2C is a perspective partial cut-away view of a preferred embodiment of the invention after tension on the pull cord has been released.
Figure 3A:
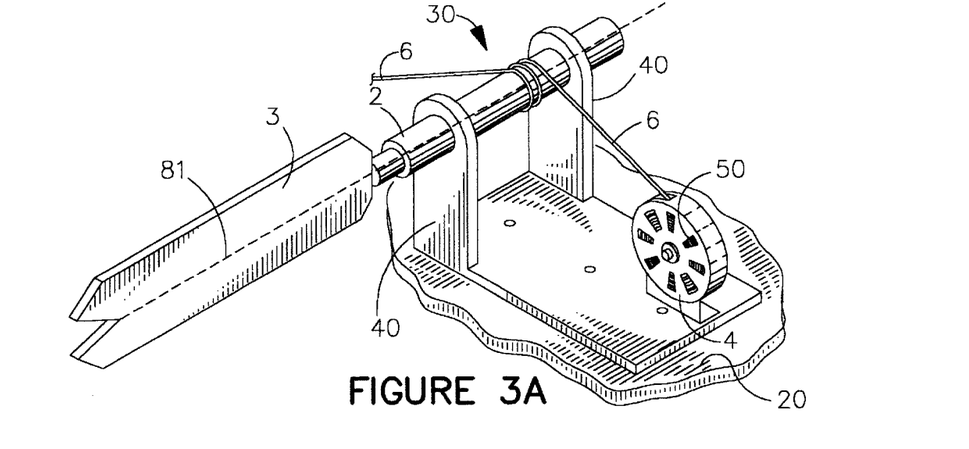
FIG. 3A is a perspective partial cut-away view of a preferred embodiment of a frame, an axle with a wing shown attached to the axle for reference, a spring-type biasing device, and the pull cord in the retracted position.
Figure 3B:
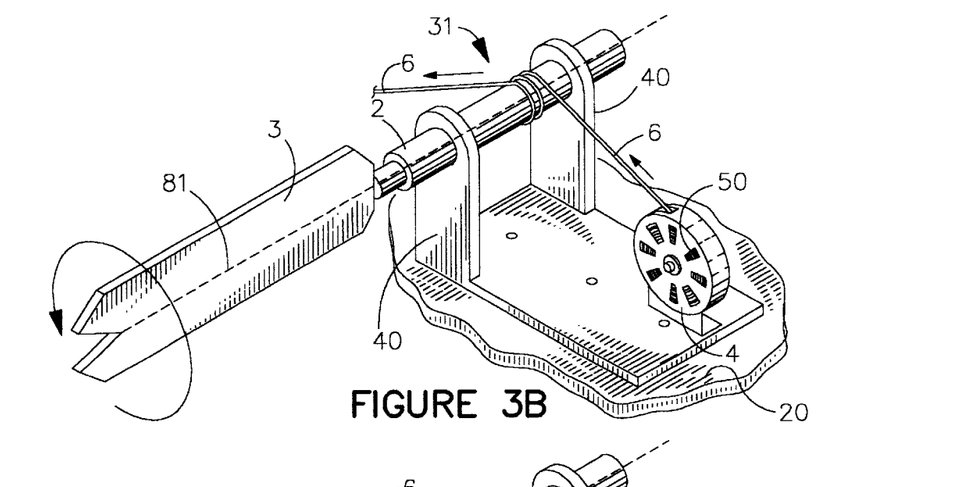
FIG. 3B is the same view shown in FIG. 3A but with the pull cord moving to the extended position, the axle and wings rotating, and the spring loading.
Figure 3C:
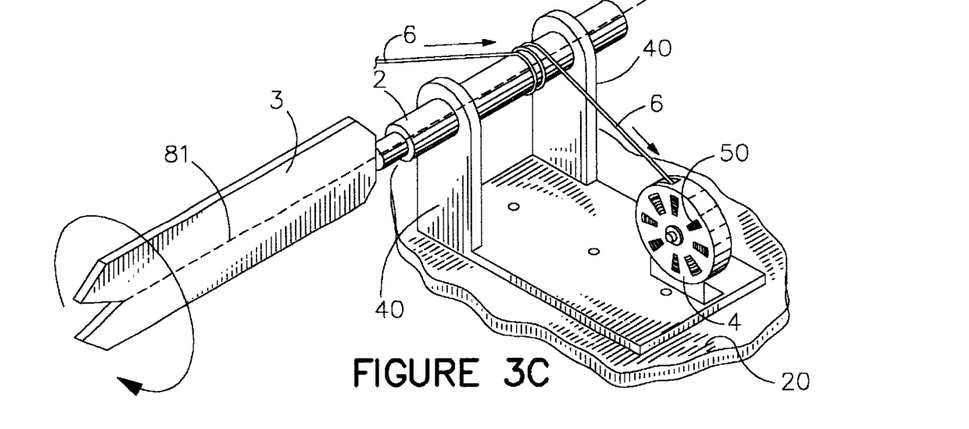
FIG. 3C is same view shown in FIG. 3B but with the pull cord moving back toward the retracted position, the axle and wings rotating in the opposite direction, and the spring unloading.
Figure 4A:
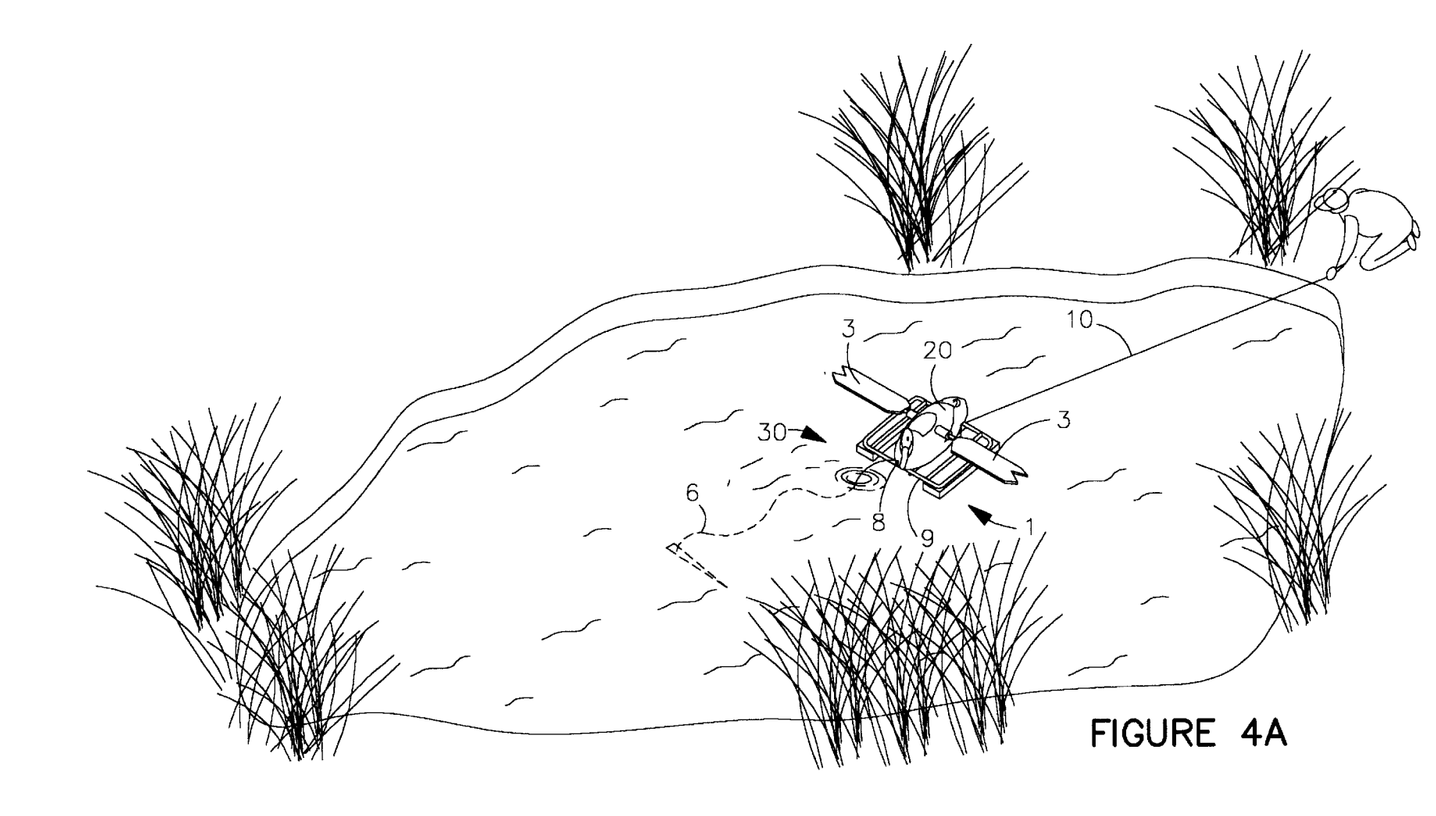
FIG. 4A is a perspective view of a preferred embodiment of the invention floating before tension is applied to the anchor cord.
Figure 4B:
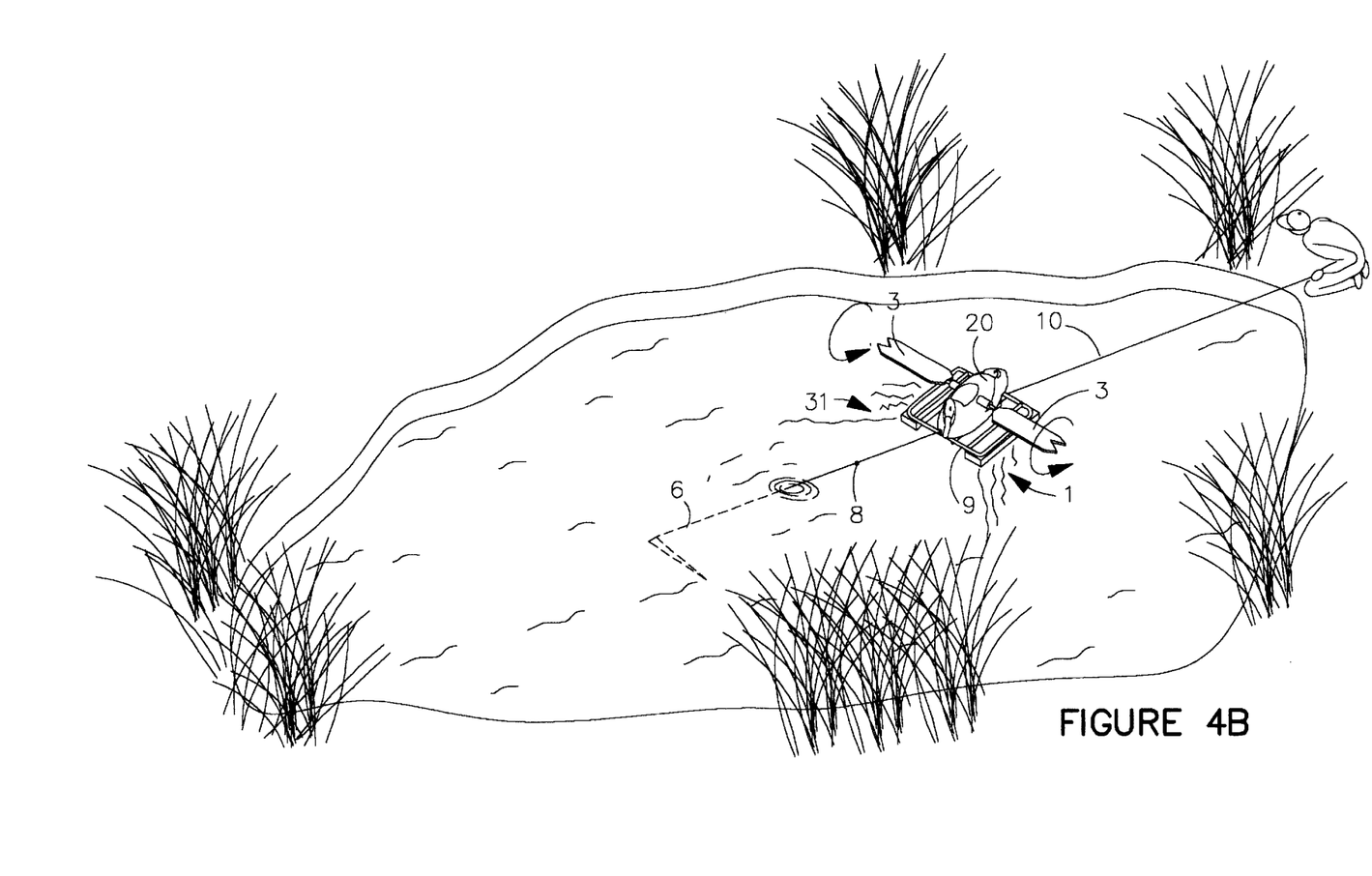
FIG. 4B is a perspective view of a preferred embodiment of the invention floating while tension is applied to the anchor cord.
Figure 4C:
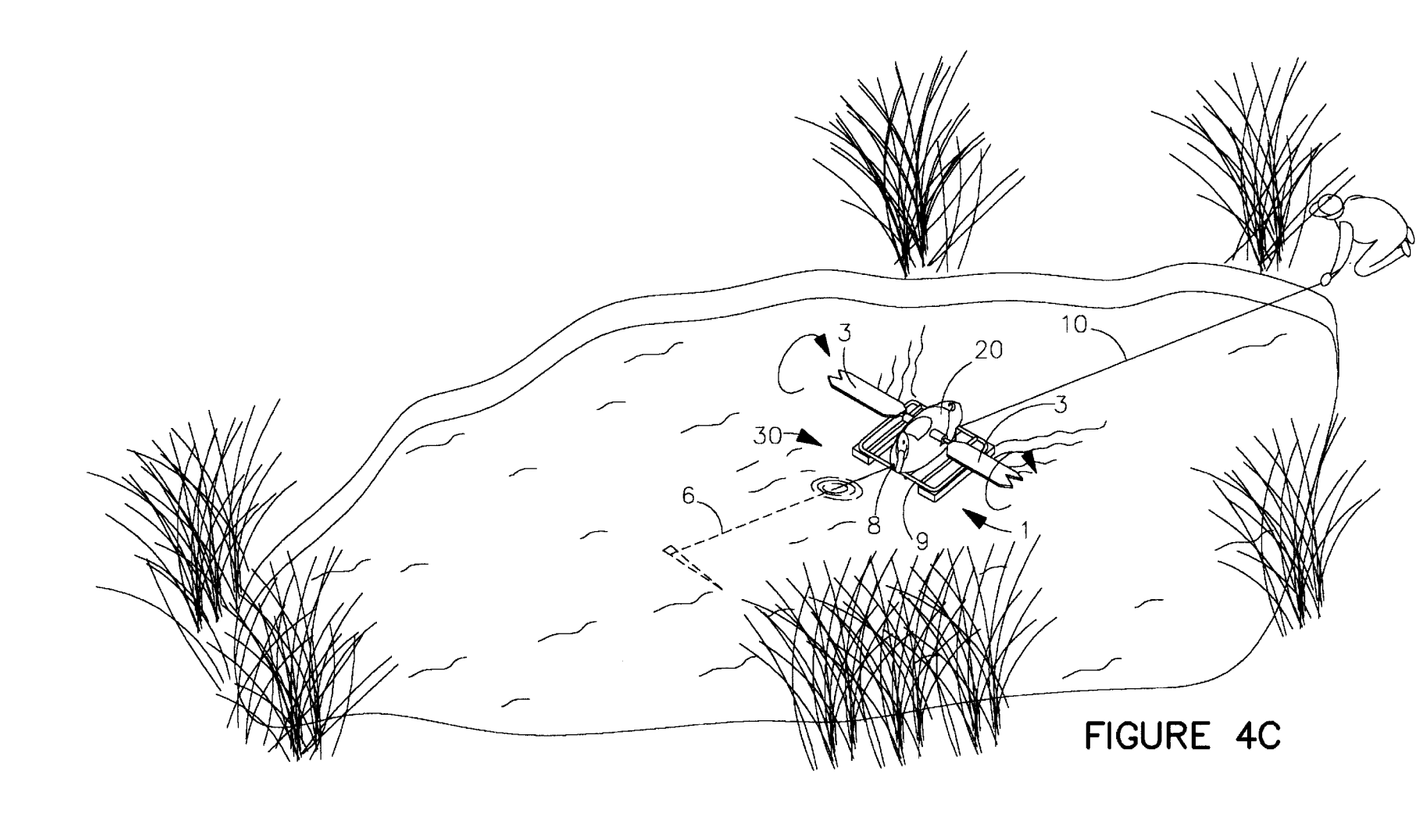
FIG. 4C is a perspective view of a preferred embodiment of the invention floating after tension on the anchor cord has been released.

The invention comprises a waterfowl decoy 1 having a rotable axle 2 mounted therein or thereon. The body 20 of waterfowl decoy 1 is preferably hollow and made of plastic. Suitable bodies 20 for decoys 1 (without axle 2) are available from the Flambeau Products Corporation, 15981 Valplast Rd.; Middlefield, Ohio 44062, or from numerous other manufacturers of waterfowl decoys.

Axle 2 may be mounted in decoy 1 in any conventional manner that allows axle 2 to rotate freely. In the preferred embodiment, axle 2 comprises a piece of ¾ inch polyvinylchloride (PVC) pipe mounted in an aluminum frame 40 attached to and rising from the bottom of decoy 1. In the preferred embodiment, axle 2 passes through body 20 of decoy 1; however, axle 2 may be situated so that it is positioned above decoy 1, if desired.

At least one wing 3, or preferably a pair of wings 3, is mounted to axle 2. Wings 3 preferably have the same axis of rotation 81 as axle 2 such that when axle 2 is rotated, wing or wings 3 rotate as well. Wings 3 are preferably made of plastic, corrugated plastic, wood or aluminum. Other material for wings 3 may be used; however, wings 3 should be able to withstand the stress of rotating rapidly in changing directions. Additionally, wings 3 like the other components of decoy 1 should preferably be corrosion resistant as decoy 1 may be used in brackish or salt water as well as fresh water, light weight as decoy 1 may need to be carried some distance by some users, and resilient enough to survive the rigors of boat travel and the unexpected encounter with an occasional charging Labrador Retriever and the like. Wings 3 should also preferably be easily detached from and reattached to axle 2 so that wings 3 may be removed during transit if desired. This may be accomplished by mounting wings 3 on a metal tube that is configured to mate with axle 2 by a conventional mechanism such as threads or cotter pins.

In the preferred embodiment, wings 3 are about twelve inches long, about 4 to 5 inches wide, with a slight taper at each end and with a central V-shaped notch at the end distal from axle 2, and about ⅛ of an inch thick, where corrugated plastic is used as the wing material. In another preferred embodiment, wings 3 have an elongated smooth oval shape of similar dimensions but with no V-shaped notch. Wings 3 should preferably be a dark color such as a flat green on their top sides 71. The opposite bottom sides 72 of wings 3 should be a lighter color, preferably white. The rotation of wings 3 will cause the light sides and the dark sides of wings 3 to alternate, creating a strobe effect. This strobe effect is desirable because many waterfowl have white or lighter feathers on the undersides of their wings. When birds are taking off or landing, they are frequently seen to take longer more powerful strokes with their wings, in order to either rise into the air more quickly or to check their speed as they lower themselves to the water or land. When taking such strokes, the undersides of their wings become visible for a fraction of a second at a time, creating a strobelike effect. Thus, the spinning wings 3 of decoy 1 will resemble a bird flapping its wings when seen from a distance.

Wings 3 are described as being mounted directly to axle 2 so that rotation of axle 2 directly rotates wings 3. However, it should be understood to those skilled in the art that wings 3 may mounted on a separate axle that is connected to and rotated through the use of gears or pulleys, without deviating from the scope of the present invention.

Axle 2 is biased against rotation in a first direction. In the preferred embodiment, the biasing device 4 is a length of rubber or preferably latex surgical tubing 5 or other elastic material. When surgical tubing 5 is used as biasing device 4, it should preferably be replaced annually. In this embodiment, the first end 62 of surgical tubing 5 is secured to body 20 of decoy 1. The opposite second end 61 is secured to axle 2 so that the rotation of axle 2 will cause surgical tubing 5 to be wrapped around axle 2. Thus, rotating axle 2 will load surgical tubing 5 by stretching it between axle 2 an first end 62 of tubing 5 attached to body 20. When the force causing the initial rotation of axle 2 ceases, surgical tubing 5, by virtue of its elastic nature, will unload, causing axle 2 to rotate in the opposite direction. A spring, such as a torsion spring, could also be used to bias axle 2. One type of torsion spring that might be used to bias axle 2 would be a clock or power spring 50 such as those available from the Peninsula Spring Corp. 6750 Silacci Way; Gilroy, Calif. 95020. These springs are commonly found in many devices including yo-yo type automatic fishing reels such as those available from Rocking "A," Ltd., P.O. Box 1170, Diamond City, Ark. 72630. In the spring embodiments, axle 2 should be attached to the spring so that as axle 2 is turned, the spring is loaded. When the force causing the initial rotation of axle 2 ceases, the spring should unload and cause axle 2 to rotate in the opposite direction.

Also attached to axle 2 is a pull cord 6. Pull cord 6 is preferably made of a rot and corrosion resistant material such as nylon or thinly braided stainless steel cable. Pull cord 6 is preferably coiled around axle 2 so that when lateral pressure is applied to pull cord 6, axle 2 will rotate as pull cord 6 unwinds. Thus, pull cord 6 will move from its retracted position 30 to its extended position 31. As explained above, moving pull cord 6 from retracted position 30 to extended position 31 will load biasing device 4. Conversely, when pull cord 6 is relaxed, biasing device 4 unloads, causing axle 2 to rotate in the opposite direction and simultaneously rewind pull cord 6 around axle 2, returning pull cord 6 to retracted position 30 and readying axle 2 to be rotated again by the next tug on pull cord 6. If biasing device 4 is capable of exerting a biasing force against axle 2 in only one direction, pull cord 6 should be wound around axle 2 in the appropriate direction so that unwinding pull cord 6 will load biasing device 4.

Pull cord 6 will operate more efficiently if it is kept neatly coiled about axle 2. Therefore, in the preferred embodiment, pull cord 6 passes through a hole 7 in the front of the body of decoy 1, which is preferably fitted with a ring made of brass or other corrosion resistant material. Pull cord 6 is also provided with an enlarged section 8, which may be a rubber grommet, a weight, or simply a knot. Enlarged section 8 should be too large to pass through hole 7. Thus, when enlarged section 8 reaches hole 7, no more of pull cord 6 will be able to be wrapped around axle 2. This will keep the portion of pull cord 6 being wrapped around axle 6 tight as it is wound and keep tension on it until the next time pull cord 6 is tugged. This will keep the coils of pull cord 6 about axle 2 trim.

Although pull cord 6 and biasing device 4 have been described as being connected through axle 2, pull cord 6 and biasing device 4 may be directly connected. An example of this embodiment would involve a clock or power spring 50, such as a yo-yo type mechanical fishing reel, mounted inside body 20. Pull cord 6 should be wrapped around a spool connected to the power spring such that a lateral tug on pull cord 6 away from decoy 1 will cause the spool to unwind and power spring 50 to load. This will move pull cord 6 from retracted position 30 to extended position 31. When tension is released from pull cord 6, power spring 50 will unload, causing the spool to turn in the opposite direction. This will draw pull cord 6 back onto the spool, returning pull cord 6 to retracted position 30. In this embodiment, pull cord 6 should engage axle 6 as it is pulled out by the user and as it is retracted by unloading power spring 50, such that the lateral motion of pull cord 6 causes axle 2 to rotate. This can be accomplished simply by coiling pull cord 6 around axle 2 or by other mechanical methods including providing axle 2 with a gear having teeth perpendicular to the longitudinal axis of axle 2 and providing pull cord 6 with a link of chain or other means of engaging the teeth of the gear. In either case, pull cord 6 will cause axle 2 to spin as pull cord 6 moves back and forth.

It should be understood that coiling pull cord 6 around axle 2 is but one example of a mechanism for transferring the lateral force of pull cord 6 into torque to be applied to axle 2 and wings 3 to generate rotational motion in wings 3. Other conventional transfer devices such as pulleys or gears could be used as well. Likewise, where power spring 50 is used, a separate cord could be used to connect power spring 50 to axle 2. In this embodiment both the separate cord extending from power spring 50 and pull cord 6 would be attached to and coiled around axle 2, but in opposite directions, similar to how pull cord 6 is used in conjunction with rubber or latex tubing 5. Thus, it should be apparent that there are a myriad of equivalent ways wings 3 can be configured to rotate when pull cord 6 is moved from retracted position 30 to extended position 31. Similarly, there are numerous equivalent ways to configure decoy 1 to automatically return pull cord 6 to retracted position 30 after it has been extended.

In one embodiment, decoy 1 is mounted to a post. In this embodiment, the user simply pulls on pull cord 6 to move it from retracted position 30 to extended position 31. As he does so, axle 2 spins as pull cord 6 is unwound, causing wings 3 to spin and biasing device 4 to load. When pull cord 6 is released, biasing device 4 unloads, causing axle 2 and wings 3 to spin in the opposite direction, rewinding pull cord 6 around axle 2, and returning pull cord 6 to retracted position 30. However, decoy 1 can also be used with a floating model. This has several advantages over simply attaching decoy 1 to a post, but it also raises several other operative concerns.

First, although it is not essential to the operation of decoy 1, it is preferred that wings 3 not strike the water as they spin. When decoy 1 is mounted on a post, decoy 1 can simply be positioned high enough above the water on the post so that wings 3 do not encounter the water as they rotate. When a floating model of decoy 1 is used, the problem must be addressed in different ways. These include using an oversized decoy 1, more narrow wings 3, and/or mounting axle 2 higher in or above body 20 of decoy 1. The inventor's preferred manner of keeping wings 3 out of the water as they rotate is to raise decoy 1 slightly by mounting it on a floating frame 9. Frame 9 is preferably comprised of a PVC pipe painted a dark color such as brown. The PVC pipe could be used as a flotation device by itself, particularly if sealed to prevent water from entering frame 9. Another option would be to fill the PVC pipe with flotation material such as styrofoam. Still another option is to secure frame 9 to a flotation material such as styrofoam. Where styrofoam is attached to frame 9, it may be secured within a dark or camouflaged heavy duty material such as CORDURA® nylon available from the E. I. du Pont de Nemours and Company corporation, DuPont Building; 1007 Market Street; Wilmington, Del. 19898. However frame 9 is configured, it should preferably hold decoy 1 slightly higher in the water so that wings 3 will not strike the water as they spin. If decoy 1 serves as its own means of flotation, it is important that decoy 1 remain watertight during construction. However, if frame 9 is used to float decoy 1, it is not as critical that decoy 1 remain watertight, which can facilitate construction.

Another concern that arises when a floating version of decoy 1 is used, as opposed to mounting decoy 1 to a fixed post, is keeping decoy 1 in place. If decoy 1 is not secured, when a user pulls on pull cord 6, decoy 1 will simply move through the water toward the user, rather than axle 2 and wings 3 spinning. A floating version of decoy 1 can be secured against substantial horizontal movement in several ways. One way would be to simply drive a stake through decoy 1 or some structure attached to decoy 1 such as frame 9. A more preferred way to secure decoy 1 is to anchor it, preferably at its rear or the rear of frame 9, to a stake such as a dowel with an eye bolt mounted on it, a heavy weight, or to some natural structure like a stump or a tree with a length of anchor cord 10. The length of anchor cord 10 will vary substantially depending on the object to which it is tied. If anchor cord 10 is tied to a weight, anchor cord 10 will have to be at least long enough for the weight to rest on the bottom. However, if anchor cord 10 is tied to a stake or to a natural object such as a tree, anchor cord 10 should preferably be about 6 feet long. In any event, it should be understood that some horizontal movement is desired in order to allow decoy 1 to disturb the surface of the water, but that decoy 1 should be checked against further horizontal movement by anchor cord 10 preferably after moving a distance that is less than the typical range of motion of a human arm so that a user can pull anchor line 10 taut and move pull cord 6 into extended position 31 with a single pull.

When a user tugs on pull cord 6 during operation of the floating model of decoy 1, decoy 1 will move through the water until anchor cord 10 becomes taut. If pull cord 10 is pulled sharply, decoy 1 will pitch forward and come to an abrupt halt. This movement of decoy 1 and its abrupt halt will create ripples in the water and cause water to splash forward, much like a duck when it lands. By using frame 9, the size of this splash can be enhanced.

As discussed above, when anchor cord 10 becomes taut, wings 3 will spin like a landing duck flapping its wings as pull cord 6 unwinds. The user can simply let pull cord 6 go slack at this point if he likes, and wings 3 will spin in the opposite direction as biasing device 4 unloads. However, the user might also hold pull cord 6 taut for a few seconds, and then release it, to imitate the wing flapping that is commonly seen in many waterfowl shortly after they land, presumably to dry and rearrange their feathers. Alternatively, when anchor cord 10 is taut, the user can repeatedly pull and release pull cord 6 to create a sustained flapping motion in decoy 1. This may be particularly desirable when waterfowl are distant and the user is attempting to interest them in his location. If the user is concerned that the waterfowl may become suspicious of decoy 1 if it continues to flap as they approach, he may simply stop pulling on pull cord 6 and decoy 1 will stop flapping or the user might only jiggle pull cord 6 lightly, to create ripples in the water, without causing wings 3 to spin. As should be apparent, the present invention gives the user a large amount of flexibility when determining how to use decoy 1.

Another preferred way of operating a floating version of decoy 1 is to secure pull cord 6 to a weight, a stake such as a dowel with an eye bolt secured to it, or a natural object such as a tree or log. When a stake is used, the operator should preferably push it into the water bottom far enough to allow the water surface to cover the top of the stake so that the stake and pull cord 6 will not be visible. After pull cord 6 is secured, the operator may then hold anchor cord 10 and pull decoy 1 back toward him with anchor cord 10. This will cause pull cord 6 to unwind, which will cause axle 2 and wings 3 to rotate in one direction as biasing device 4 loads. When the operator releases the anchor cords, biasing device will unload, causing axle 2 and wings 3 to rotate in the opposite direction. As axle 2 rotates, it will wind pull cord 6 around axle 2 again. This will pull decoy 1 across the surface of the water toward the end of pull cord 6 that is secured to the weight, stake, or other object. This will cause decoy 1 to disturb the surface of the water and in fact create a noticeable splash, as its wings 3 spin. Thus, decoy 1 will resemble a duck or other waterfowl landing. The operator may pull decoy 1 back with anchor cord 10 before birds are present or while they have circled out of sight, and then release anchor cord 10 to create the illusion of another bird landing when the birds are circling overhead. Alternatively, the operator may pull decoy 1 back and forth with anchor cord I to cause wings 10 to spin, as described above.

The operator typically will not need to pull decoy 1 across the water more than about a foot, to obtain the desired effect. Excessive movement of decoy 1 could obviously damage biasing devise 4.

As decoy 1 moves across the water, it will create ripples which will cause the other decoys to move and generally add motion to the entire spread. The amount of motion can be increased by attaching pull cord 6 to a stake located about a foot from decoy 1 and by lowering the attachment point deeper in the water. This will cause decoy 1 to pulled into the water slightly, thereby creating more waves. This effect can be maximized by adding a second stake about two to three feet from decoy 1, and attaching pull cord 6 to it. Pull cord 6 should run through an eye bolt located on the first stake located about a foot from decoy 1. Again, this will have the effect of pulling decoy 1 into the water, creating the maximum amount of disturbance to the surface of the water. Ideally, the operator should vary the amount he causes decoy 1 to move depending upon the response of the waterfowl to the motion.

In a preferred embodiment, another stake such as a dowel with an eye bolt mounted on it is provided near the blind where the operator will hide. This stake should also be pushed into the bottom far enough to allow the water surface to cover the top of the stake. Anchor cord 10 or pull cord 6, depending upon the direction in which decoy 1 is being operated, should be run through the eye bolt on this second dowel. This will keep anchor cord 10 or pull cord 6 submerged and out of sight as the operator tugs on cord 6 or 10.

Particularly when decoy 1 is configured to resemble a hen or female waterfowl, the operator may wish to tie another floating decoy, preferably one configured to resemble a drake or male waterfowl, to the rear of decoy 1. Thus, when the operator releases anchor cord 10 and decoy 1 advances across the water toward the end of pull cord 6 attached to the weight, stake, or other object, decoy 1 will pull the other floating decoy behind it. This will create the illusion of a drake chasing a hen across the water, common pairing behavior in waterfowl in late winter when breeding pairs are forming before the spring migration.

Many waterfowlers will leave an opening or "pocket" in their decoy spread in front of the blind to encourage waterfowl to land there. Decoy 1 should preferably be placed in this pocket, ideally close to the blind, making its movement more visible. Preferably, decoy 1 should be taken in after each day of usage to prevent weather damage to decoy 1.

The foregoing description is provided in the context of using decoy 1 to attract waterfowl. However, it should be understood that the principles of this invention are applicable to any motion decoy for birds or other wildlife. The inventor intends to cover such embodiments and their equivalents within the scope of the following claims.

I claim:

1. A motion decoy comprising:
   a body secured against substantial horizontal movement;
   a rotable axle mounted to said body, said axle having a first direction of rotation and a second opposite direction of rotation;
   a pull cord connected to and wound about said axle whereby a lateral force applied to said pull cord in a direction away from said decoy will cause said axle to rotate in said first direction;
   a biasing device operatively connected to said axle, said biasing device configured to cause said axle to rotate in said second direction after said axle is rotated in said first direction and said lateral force on said pull cord is released; and
   at least one wing attached to said axle, said wing having an axis of rotation substantially parallel to said axle whereby said wing will rotate about its axis of rotation when said axle is rotated, said wing further having a dark side and a light side, whereby rotation of said wing will alternately display said dark side and said light side of said wing.

2. A decoy according to claim 1 wherein said body is configured to resemble a bird.

3. A decoy according to claim 2 wherein said bird is a waterfowl.

4. A decoy according to claim 3 wherein said waterfowl is a duck.

5. A decoy according to claim 3 wherein said waterfowl is a goose.

6. A decoy according to claim 1 wherein said biasing device is a spring.

7. A decoy according to claim 1 wherein said biasing device is an elongated section of tubing comprising a material selected from the group consisting of rubber and latex, said tubing having a first end attached to said axle and a second end opposite said first end and attached to said body, whereby rotation of said axle in said first direction will wind said tubing around said axle, load said tubing by stretching said tubing between said axle and said second end, and cause said tubing to exert a force against said axle in said second direction of rotation.

8. A decoy according to claim 1 wherein said decoy is configured to float.

9. A decoy according to claim 8 wherein said decoy is secured against substantial horizontal movement with an anchor line connecting said decoy to a weight.

10. A decoy according to claim 8 wherein said decoy is secured against substantial lateral movement with an anchor line connecting said decoy to a stake.

11. A decoy according to claim 8 wherein said decoy is secured against substantial lateral movement with an anchor line connecting said decoy to a natural substantially immovable object.

12. A decoy according to claim 8 wherein said decoy is configured to float by mounting said body on a floating frame.

13. A decoy according to claim 1 wherein said body is secured against substantial lateral movement by mounting said decoy on a stake that has been driven into the ground.

14. A decoy according to claim 1 further comprising a pair of wings operatively attached to said axle.

15. A decoy according to claim 14 wherein said wings are releasably attached to said axle.

16. A motion decoy comprising;
    a body secured against substantial horizontal movement;
    at least one wing, said wing having a top side and a bottom side opposite said top side, said wing having an axis of rotation about which said wing is configured to rotate when torque is applied to said wing, said axis of rotation positioned to invert said top side and said bottom side during rotation;
    a pull cord operatively connected to said wing, said pull cord having an extended position and a retracted position, said pull cord configured to be moved from said retracted position to said extended position by the application of a lateral force to said pull cord in a direction away from said decoy, said pull cord further configured to apply torque to said wing as said pull cord is moved from said retracted position to said extended position whereby said wing may be rotated about its axis of rotation; and
    a biasing device configured to return said pull cord to said retracted position when the application of said lateral force to said pull cord is ceased.

17. A decoy according to claim 16 wherein said body is configured to resemble a bird.

18. A decoy according to claim 17 wherein said bird is a waterfowl.

19. A decoy according to claim 18 wherein said waterfowl is a duck.

20. A decoy according to claim 18 wherein said waterfowl is a goose.

21. A decoy according to claim 16 wherein said biasing device is configured to apply torque to said wing, whereby said wing may be further rotated about its axis of rotation when the application of said lateral force to said pull cord is ceased.

22. A decoy according to claim 21 wherein said biasing device is configured to rotate said wing in the opposite direction from the direction said wing is configured to rotate when said pull cord is moved from said retracted position to said extended position.

23. A decoy according to claim 16 wherein said biasing device is a spring.

24. A decoy according to claim 23 wherein said pull cord is operatively connected to said spring whereby moving said pull cord from said retracted position to said extended position will load said spring.

25. A decoy according to claim 24 wherein said spring is configured to unload when the application of said lateral force to said pull cord is ceased.

26. A decoy according to claim 25 wherein said spring is operatively connected to said wing, said spring configured to apply torque to said wing when said spring unloads, whereby said wing may be rotated about its axis of rotation as said spring unloads.

27. A decoy according to claim 26 wherein the direction in which said wing is configured to rotate when said spring unloads is opposite from the direction in which said wing is configured to rotate as said pull cord moves from said retracted position to said extended position.

28. A decoy according to claim 16 wherein said biasing device is an elongated section of tubing comprising a material selected from the group consisting of rubber and latex, said tubing having a first end attached to said axle and a second end opposite said first end and attached to said body, whereby rotation of said axle in a first direction will wind said tubing around said axle, load said tubing by stretching said tubing between said axle and said second end, and cause said tubing to exert a force against said axle in a direction opposite said first direction.

29. A decoy according to claim 16 wherein said decoy is configured to float.

30. A decoy according to claim 29 wherein said decoy is secured against substantial horizontal movement with an anchor line connecting said decoy to a weight.

31. A decoy according to claim 29 wherein said decoy is secured against substantial horizontal movement with an anchor line connecting said decoy to a stake.

32. A decoy according to claim 29 wherein said decoy is secured against substantial lateral movement with an anchor line connecting said decoy to a natural substantially immovable object.

33. A decoy according to claim 29 wherein said decoy is configured to float by mounting said body on a floating frame.

34. A decoy according to claim 16 wherein said body is secured against substantial lateral movement by mounting said decoy on a stake that has been driven into the ground.

35. A decoy according to claim 16 further comprising a pair of wings operatively attached to said axle.

36. A decoy according to claim 35 wherein said wings are releasably attached to said axle.

37. A decoy accord to claim 35 wherein said bottom side of said wings are substantially lighter in color than said top side.

38. A decoy according to claim 37 wherein said bottom side of said wings are substantially white.

39. A decoy accord to claim 16 wherein said bottom side of said wing is substantially lighter in color than said top side.

40. A decoy according to claim 39 wherein said bottom side of said wing is substantially white.

41. A method of attracting birds to an area comprising:

placing a decoy in said area, said decoy comprising (a) a body configured to resemble a bird and secured against substantial horizontal movement; at least one wing (b), said wing having a top side and a bottom side opposite from and substantially lighter in color than said top side, said wing having an axis of rotation about which said wing is configured to rotate when torque is applied to said wing, said axis of rotation positioned to invert said top side and said bottom side during rotation; (c) a pull cord operatively connected to said wing, said pull cord having an extended position and a retracted position, said pull cord configured to be moved from said retracted position to said extended position by the application of a lateral force to said pull cord in a direction away from said decoy, said pull cord further configured to apply torque to said wing as said pull cord is moved from said retracted position to said extended position whereby said wing may be rotated about its axis of rotation; and (d) a biasing device configured to return said pull cord to said retracted position when the application of said lateral force to said pull cord is ceased;

applying a lateral force to said pull cord in a direction away from said decoy sufficient to move said pull cord from said retracted position to said extended position, whereby torque is applied to said wing and said wing is caused to rotate about said axis of rotation; and ceasing to apply said lateral force to said pull cord.

42. A method of attracting birds to an area comprising:

placing a floating decoy in said area, said decoy comprising (a) a body configured to resemble a bird and secured against substantial horizontal movement; (b) at least one wing, said wing having a top side and a bottom side opposite from and substantially lighter in color than said top side, said wing having an axis of rotation about which said wing is configured to rotate when torque is applied to said wing, said axis of rotation positioned to invert said top side and said bottom side during rotation; (c) a pull cord operatively connected to said wing, said pull cord having an extended position and a retracted position, said pull cord configured to be moved from said retracted position to said extended position by the application of a lateral force to said pull cord in a direction away from said decoy, said pull cord further configured to apply torque to said wing as said pull cord is moved from said retracted position to said extended position whereby said wing may be rotated about its axis of rotation; and (d) a biasing device configured to return said pull cord to said retracted position when the application of said lateral force to said pull cord is ceased;

securing said pull cord to a substantially fixed object;

applying a lateral force to said decoy in a direction away from said substantially fixed object sufficient to move said decoy away from said substantially fixed object and thereby cause said pull cord to move from said retracted position to said extended position, whereby torque is applied to said wing and said wing is caused to rotate about said axis of rotation; and ceasing to apply said lateral force to said decoy.

43. A motion decoy comprising:

a body secured against substantial horizontal and vertical movement;

a rotable axle mounted to said body, said axle having a first direction of rotation and a second opposite direction of rotation;

a pull cord connected to and wound about said axle whereby a force applied to said pull cord in a direction away from said decoy will cause said axle to rotate in said first direction;

a biasing device operatively connected to said axle, said biasing device configured to cause said axle to rotate in said second direction after said axle is rotated in said first direction and said force on said pull cord is released; and at least one wing attached to said axle, said wing having an axis of rotation substantially parallel to said axle whereby said wing will rotate about its axis of rotation when said axle is rotated, said wing further having a dark side and a light side, whereby rotation of said wing will alternately display said dark side and said light side of said wing.

44. A decoy according to claim 43 wherein said body is configured to resemble a waterfowl.

45. A decoy according to claim 43 wherein said decoy is configured to float.

46. A decoy according to claim 43 further comprising a pair of wings operatively attached to said axle.

47. A motion decoy comprising a body secured against substantial horizontal and vertical movement;

at least one wing, said wing having a top side and a bottom side opposite said top side, said wing having an axis of rotation about which said wing is configured to rotate when torque is applied to said wing, said axis of rotation positioned to invert said top side and said bottom side during rotation;

a pull cord operatively connected to said wing, said pull cord having an extended position and a retracted position, said pull cord configured to be moved from said retracted position to said extended position by the application of a force to said pull cord in a direction away from said decoy, said pull cord further configured to apply torque to said wing as said pull cord is moved from said retracted position to said extended position whereby said wing may be rotated about its axis of rotation; and a biasing device configured to return said pull cord to said retracted position when the application of said force to said pull cord is ceased.

48. A decoy according to claim 47 wherein said body is configured to resemble a waterfowl.

49. A decoy according to claim 47 wherein said biasing device is configured to apply torque to said wing, whereby said wing may be further rotated about its axis of rotation when the application of said force to said pull cord is ceased.

50. A decoy according to claim 49 wherein said biasing device is configured to rotate said wing in the opposite direction from the direction said wing is configured to rotate when said pull cord is moved from said retracted position to said extended position.

51. A decoy according to claim 49 wherein said decoy is configured to float.

* * * * *